(12) United States Patent
Marschall et al.

(10) Patent No.: US 11,812,215 B2
(45) Date of Patent: Nov. 7, 2023

(54) METHOD AND SYSTEM FOR CALIBRATING A STRUCTURE-BORNE SOUND-SENSITIVE ACCELERATION SENSOR AND METHOD FOR CORRECTING THE MEASURING SIGNALS OF A STRUCTURE-BORNE SOUND-SENSITIVE ACCELERATION SIGNAL

(71) Applicant: Robert Bosch GmbH, Stuttgart (DE)

(72) Inventors: Christian Marschall, Reutlingen (DE); Amin Jemili, Kusterdingen (DE); Sergej Scheiermann, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 17 days.

(21) Appl. No.: 17/648,508

(22) Filed: Jan. 20, 2022

(65) Prior Publication Data

US 2022/0248124 A1 Aug. 4, 2022

(30) Foreign Application Priority Data

Feb. 1, 2021 (DE) ...................... 10 2021 200 860.7

(51) Int. Cl.
*H04R 1/10* (2006.01)
*G06F 3/01* (2006.01)
(52) U.S. Cl.
CPC ........... *H04R 1/1075* (2013.01); *G06F 3/012* (2013.01); *H04R 1/1083* (2013.01)

(58) Field of Classification Search
CPC ...... H04R 1/1075; H04R 1/1083; G06F 3/012
See application file for complete search history.

(56) References Cited

U.S. PATENT DOCUMENTS

2017/0078790 A1\* 3/2017 Yen .................. H04R 3/005
2022/0132245 A1\* 4/2022 Klimanis ............ H04R 3/005

FOREIGN PATENT DOCUMENTS

DE 102010015400 A1 10/2011

\* cited by examiner

*Primary Examiner* — Andrew L Sniezek
(74) *Attorney, Agent, or Firm* — NORTON ROSE FULBRIGHT US LLP; Gerard Messina

(57) ABSTRACT

A method for calibrating a structure-borne sound-sensitive acceleration sensor with the aid of at least one microphone. For this purpose, the acceleration sensor is situated in an intended position on the body of a user. Furthermore, at least one acceleration sensor signal and at least one microphone signal are detected, the at least one acceleration sensor signal and the at least one microphone signal being synchronized and having been caused by a vocalization of the user. A frequency analysis of the acceleration sensor signal and a frequency analysis of the microphone signal are carried out. A frequency-dependent correction function for correcting the transmission function of the acceleration sensor is ascertained on the basis of the frequency analyses of the acceleration sensor signal and the microphone signal.

10 Claims, 2 Drawing Sheets

METHOD AND SYSTEM FOR CALIBRATING A STRUCTURE-BORNE SOUND-SENSITIVE ACCELERATION SENSOR AND METHOD FOR CORRECTING THE MEASURING SIGNALS OF A STRUCTURE-BORNE SOUND-SENSITIVE ACCELERATION SIGNAL

CROSS REFERENCE

The present application claims the benefit under 35 U.S.C. § 119 of German Patent Application DE 10 2021 200 860.7 filed on Feb. 1, 2021, which is expressly incorporated herein by reference in its entirety.

FIELD

The present invention relates to a method for calibrating a structure-borne sound-sensitive acceleration sensor and a system for calibrating a structure-borne sound-sensitive acceleration sensor. Furthermore, the present invention relates to a method for correcting the measuring signals of a structure-borne sound-sensitive acceleration sensor. In particular, the present invention relates to structure-borne sound-sensitive acceleration sensors, which are worn on the head of the user, in particular in in-ear headphones.

BACKGROUND INFORMATION

In-ear headphones or earphones are worn directly in the ear and are usually wirelessly connected to a portable device, such as a smart phone, a smartwatch, or the like. Sensors may be integrated into the in-ear headphones. For example, microphones may be provided, which detect speech signals of the user. Furthermore, inertial sensors may be provided, which detect an interaction of the user with the in-ear headphones. For example, an acceleration sensor may be provided to recognize certain gestures, using which the user controls the in-ear headphone. The user may thus tap once or twice on the in-ear headphone with the finger to activate or deactivate certain functions. Such gestures are also referred to as a tap or double tap interaction. For example, the playback of music may be paused, a next song may be sought out, or the volume may be adjusted by such a gesture.

Furthermore, an acceleration sensor including particularly high bandwidth may be provided, which is integrated into the in-ear headphone to measure structure-borne sound. Such an acceleration sensor is also referred to as an acoustic acceleration sensor. The structure-borne sound is generated by the vocal cords of the user and conducted via the body of the user to the in-ear headphone and may be detected there by the acoustic acceleration sensor.

The acoustic path extending from the vocal cords of the user to the in-ear headphone is in first approximation undisturbed by external noise influences which may occur, for example, if a neighbor speaks loudly. This advantageous property, according to which primarily the structure-borne sound, which was generated by the wearer of the in-ear headphone himself, is detected via the acoustic path, may be used to suppress ambient noises during phone calls and may thus contribute to active noise cancellation (ANC).

The exact bandwidth of the structure-borne sound transmitted via the structure-borne sound path from the vocal cords to the sensors in the ear is subject to a variation, which is due to the individual formation of the head of the user. The precise quality of the tissue in the acoustic path between the vocal cords of the user and the ear of the user differs for various users. The portions and the location of bones, layers of fat, or areas including liquid such as water and blood are particularly relevant in this regard. Various resonances and anti-resonances may occur as a function of the portions and the location.

The positioning of the device at or in the pinna also influences the bandwidth and the bandwidth thus varies for various users. A single user may also wear the in-ear headphone in different ways at various times, so that the bandwidth may also vary for the same user.

Due to the mentioned variations of the bandwidth, a first user may certainly generate a speech signal having a bandwidth of 2 kHz, while a second person may generate signals having a bandwidth up to 2.5 kHz, without the transmission function appearing noticeably damped.

The performance of the algorithms for speech processing or active noise cancellation may vary due to a varying transmission function. It is therefore desirable to compensate for the variations of the transmission function.

SUMMARY

The present invention provides a method and a system for calibrating a structure-borne sound-sensitive acceleration sensor and a method for correcting the measuring signals of a structure-borne sound-sensitive acceleration sensor.

Preferred specific example embodiments of the present invention are disclosed herein.

According to a first aspect, the present invention accordingly relates to a method for calibrating a structure-borne sound-sensitive acceleration sensor with the aid of at least one microphone. In accordance with an example embodiment of the present invention, for this purpose, the acceleration sensor is situated in an intended position on the body of a user. Furthermore, at least one acceleration sensor signal and at least one microphone signal are detected, the at least one acceleration sensor signal and the at least one microphone signal being synchronized and having been caused by a vocalization of the user. A frequency analysis of the acceleration sensor signal and a frequency analysis of the microphone signal are carried out. A frequency-dependent correction function for correcting the transmission function of the acceleration sensor is ascertained on the basis of the frequency analyses of the acceleration sensor signal and the microphone signal.

According to a second aspect, the present invention accordingly relates to a system for calibrating a structure-borne sound-sensitive acceleration sensor, which is situated in an intended position on the body of a user. In accordance with an example embodiment of the present invention, the system includes at least one microphone, which is designed to detect at least one microphone signal when the acceleration sensor detects an acceleration sensor signal caused by a vocalization of the user. Furthermore, the system includes a signal processing unit, which is designed to carry out a frequency analysis of the acceleration sensor signal and a frequency analysis of the at least one microphone signal detected synchronously with the acceleration sensor signal and to ascertain a frequency-dependent correction function for correcting the transmission function of the acceleration sensor on the basis of the frequency analyses of the acceleration sensor signal and the at least one microphone signal. The system finally includes a memory unit for storing parameters of the presently ascertained correction function.

According to a third aspect, the present invention relates to a method for correcting the measuring signals of a structure-borne sound-sensitive acceleration sensor, for which a frequency-dependent correction function has been ascertained with the aid of the calibration method according to the present invention, the correction of the measuring signals taking place with the aid of a signal processing unit of the acceleration sensor, which applies the correction function to the measuring signals.

The present invention enables a user-specific calibration of the transmission function of the acceleration sensor or structure-borne sound sensor. The calibration may be carried out by an algorithm and enables the acceleration sensor to behave similarly to the microphone with respect to the transmission function.

Due to the use of the microphone for calibrating the acceleration sensor, a significant improvement may be achieved, since the transmission function of the microphone is typically significantly better in the frequency range relevant for human speech than that of the acceleration sensor.

A user-independent frequency function may be generated by the correction, which approximately ensures the most equal bandwidth possible of, for example, 2.5 kHz for each user.

According to one specific embodiment of the method for calibrating a structure-borne sound-sensitive acceleration sensor in accordance with the present invention, the acceleration sensor is integrated into a device worn on the head. The device worn on the head may be, for example, a headphone, an in-ear headphone, spectacles, or the like.

According to one specific embodiment of the method for calibrating a structure-borne sound-sensitive acceleration sensor in accordance with the present invention, the microphone is integrated into a portable device, in particular a smart phone.

According to another specific embodiment of the method for calibrating a structure-borne sound-sensitive acceleration sensor in accordance with the present invention, the microphone is integrated together with the structure-borne sound-sensitive acceleration sensor in a portable device, in particular in an in-ear headphone.

According to another specific embodiment of the method for calibrating a structure-borne sound-sensitive acceleration sensor in accordance with the present invention, the frequency analysis of the acceleration sensor signal and the microphone signal includes a transformation into the frequency range to determine the amplitude response and the phase response. The transformation may be, for example, a Fourier transformation, a Laplace transformation, or a z transformation.

According to another specific embodiment of the method for calibrating a structure-borne sound-sensitive acceleration sensor in accordance with the present invention, the frequency-dependent correction function is ascertained on the basis of the frequency analyses of multiple acceleration sensor signals and microphone signals each detected synchronously thereto, the acceleration sensor signals and the microphone signals having been caused by multiple vocalizations of one or multiple users. According to one specific embodiment of the present invention, averaging may be carried out. The averaging may be individualized, i.e., carried out for a specific user. Furthermore, the averaging may also take place over various users, so that a correction function is generated for a standard user.

According to another specific embodiment of the method for calibrating a structure-borne sound-sensitive acceleration sensor in accordance with the present invention, parameters of the correction function are stored on a memory unit of the acceleration sensor and/or on an external memory unit. The external memory unit may be, for example, a memory unit of a digital signal processor (DSP), which is integrated into a device worn on the head, which includes the structure-borne sound-sensitive acceleration sensor. The external memory unit may also be associated with a host processor of a connected portable device, such as a mobile telephone, or a manufacturing-side processing unit if the calibration takes place at the factory.

According to another specific embodiment of the method for calibrating a structure-borne sound-sensitive acceleration sensor in accordance with the present invention, the frequency analysis of the at least one acceleration sensor signal and/or the frequency analysis of the at least one microphone signal and/or the ascertainment of the correction function for correcting the transmission function of the acceleration sensor takes place on an external signal processing unit outside the acceleration sensor. In particular, higher-performance processing units may thus be used, the demands on the processing unit of the acceleration sensor being able to be reduced.

According to another specific embodiment of the method for calibrating a structure-borne sound-sensitive acceleration sensor in accordance with the present invention, the method is started as soon as the user has situated the acceleration sensor in the intended position and speaks for the first time. A regular calibration is thus ensured. The calibration may thus be carried out by the user during operation.

According to another specific embodiment of the method for calibrating a structure-borne sound-sensitive acceleration sensor in accordance with the present invention, the method is started as soon as a keyword spoken by the user is recognized. The keyword may be, for example, a command provided to wake up the acceleration sensor or a control command. The keyword may be provided exclusively for the calibration or also additionally trigger an action independent of the calibration method.

According to one specific embodiment of the system for calibrating a structure-borne sound-sensitive acceleration sensor in accordance with the present invention, the components of the system are at least partially integrated into various devices. Components of the system may thus be part of the acceleration sensor, may be integrated into an in-ear headphone, and/or may be integrated into a device connected thereto, such as a smart phone.

According to another specific embodiment of the method for correcting the measuring signals of a structure-borne sound-sensitive acceleration sensor in accordance with the present invention, the correction of the measuring signals takes place outside the acceleration sensor, with the aid of an external signal processing unit, which applies the correction function to the measuring signals.

According to another specific embodiment of the method for correcting the measuring signals of a structure-borne sound-sensitive acceleration sensor in accordance with the present invention, the correction of the measuring signals is carried out by the acceleration sensor itself.

Figure 1:
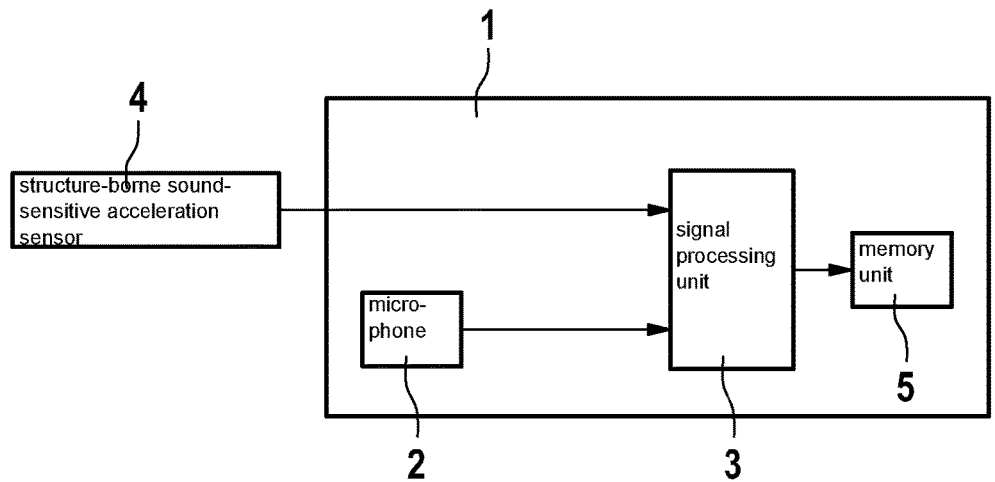
FIG. 1 shows a schematic block diagram of a system for calibrating a structure-borne sound-sensitive acceleration sensor according to one specific embodiment of the present invention.

In all figures, identical or functionally-identical elements and devices are provided with the same reference numerals. The numbering of method steps is used for clarity and is in general not to imply a specific time sequence. In particular, multiple method steps may also be carried out at the same time.

DETAILED DESCRIPTION OF EXAMPLE EMBODIMENTS

FIG. 1 shows a schematic block diagram of a system 1 for calibrating a structure-borne sound-sensitive acceleration sensor 4. The structure-borne sound-sensitive acceleration sensor is located during the calibration process in an intended position on the body of a user. For example, structure-borne sound-sensitive acceleration sensor 4 is integrated into an in-ear headphone, which is worn by the user during the calibration.

System 1 includes a microphone 2, which may be integrated, for example, into a smart phone. Microphone 2 and structure-borne sound-sensitive acceleration sensor 4 may also, however, be integrated into the same device, such as a headphone including a microphone function.

Microphone 2 is preferably designed to detect frequencies in a sufficiently large frequency range, preferably of greater than 2.5 kHz.

Microphone 2 is synchronized with acceleration sensor 4. When acceleration sensor 4 detects an acceleration sensor signal caused by a vocalization of the user, microphone 2 detects a microphone signal at the same time. The vocalization of the user may preferably be a spoken utterance, such as a predefined word or a predefined sentence. The calibration may be started and carried out manually or automatically, for example, the calibration may also be automatically triggered by a keyword, which is spoken by the user and is recognized on the basis of the microphone signal.

Furthermore, system 1 includes a signal processing unit 3, which includes a processing unit, such as a microprocessor, an integrated circuit, or the like. Signal processing unit 3 carries out a frequency analysis of the acceleration sensor signal and a frequency analysis of the microphone signal detected synchronously with the acceleration sensor signal, for example with the aid of Fourier transformation, Laplace transformation, z transformation, or the like. Based on the transformation, for example, a frequency-dependent amplitude response and/or a frequency-dependent phase response with regard to the vocalization of the user, may be ascertained.

Furthermore, signal processing unit 3 calculates a frequency-dependent correction function for correcting the transmission function of the acceleration sensor. The calculation is carried out on the basis of the frequency analyses of the acceleration sensor signal and the microphone signal.

Signal processing unit 3 may calculate the correction function with calculated frequency functions $S_{microphone}$ of the microphone and $S_{accelerationsensor}$ of the acceleration sensor on the basis of the following formula, H(f) representing the desired correction function:

$$|H(f)| = \sqrt{\frac{S_{microphone}(f)}{S_{accelerometer}(f)}}$$

Finally, system 1 includes a memory unit 5 for storing parameters of the presently ascertained correction function.

The stored correction function may be used to carry out a correction of the measuring signals of structure-borne sound-sensitive acceleration sensor 4. In this correction, the transmission function of the acceleration sensor is adapted at least in a limited frequency range to the transmission function of the microphone. This correction is based on the assumption that the transmission function of the microphone in this frequency range is significantly better than that of the acceleration sensor.

Figure 2:
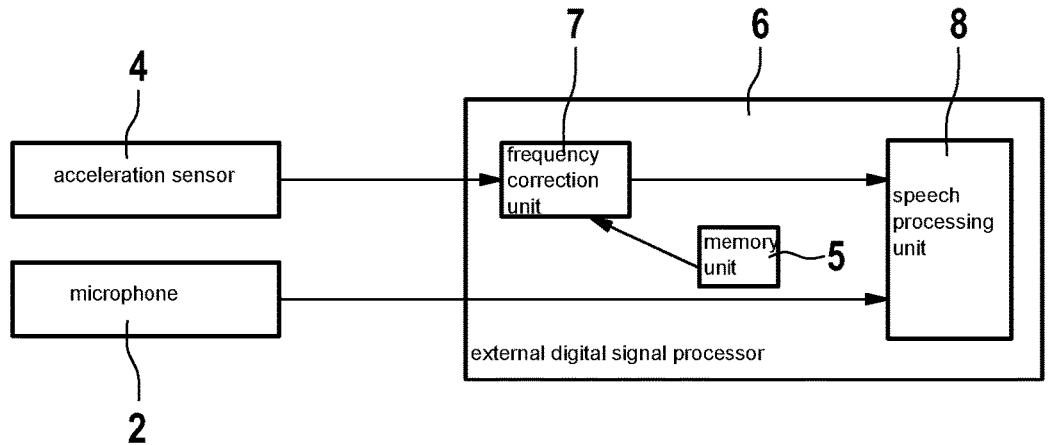
FIG. 2 shows a schematic block diagram to illustrate the correction of the measuring signals of a structure-borne sound-sensitive acceleration sensor.

FIG. 2 shows a schematic block diagram to illustrate the correction of the measuring signals of structure-borne sound-sensitive acceleration sensor 4.

The acceleration sensor signals of structure-borne sound-sensitive acceleration sensor 4 are transmitted to an external digital signal processor 6. External digital signal processor 6 includes a frequency correction unit 7 for carrying out a frequency correction, the ascertained correction function stored in memory unit 5 being used to correct the measuring signals of structure-borne sound-sensitive acceleration sensor 4. The correction function may be multiplied or convoluted with the measuring signals, for example, to carry out the correction. The corrected measuring signals of structure-borne sound-sensitive acceleration sensor 4 are provided to a speech processing unit 8.

Speech processing unit 8 furthermore receives the microphone signals of a microphone 2, which is also used to generate the correction function. On the basis of the corrected measuring signals of structure-borne sound-sensitive acceleration sensor 4 and the microphone signals of microphone 2, speech processing unit 8 provides functions such as speech recognition, speech transmission, speech control, and the like.

Figure 3:
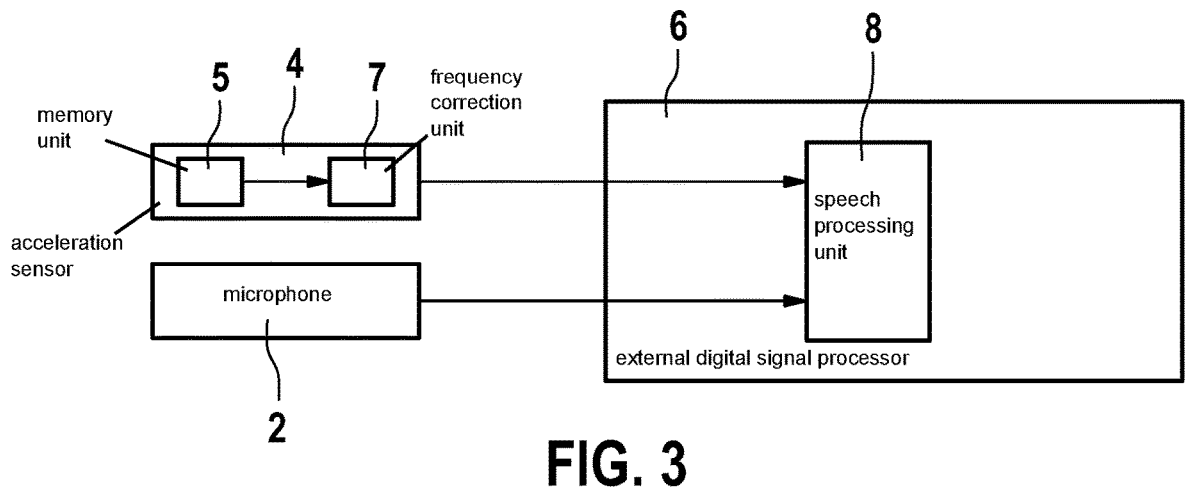
FIG. 3 shows another schematic block diagram to illustrate the correction of the measuring signals of a structure-borne sound-sensitive acceleration sensor.

FIG. 3 shows a further schematic block diagram to illustrate the correction of the measuring signals of structure-borne sound-sensitive acceleration sensor 4. This structure differs in that frequency correction unit 7 for carrying out the frequency correction is integrated into structure-borne sound-sensitive acceleration sensor 4.

Figure 4:
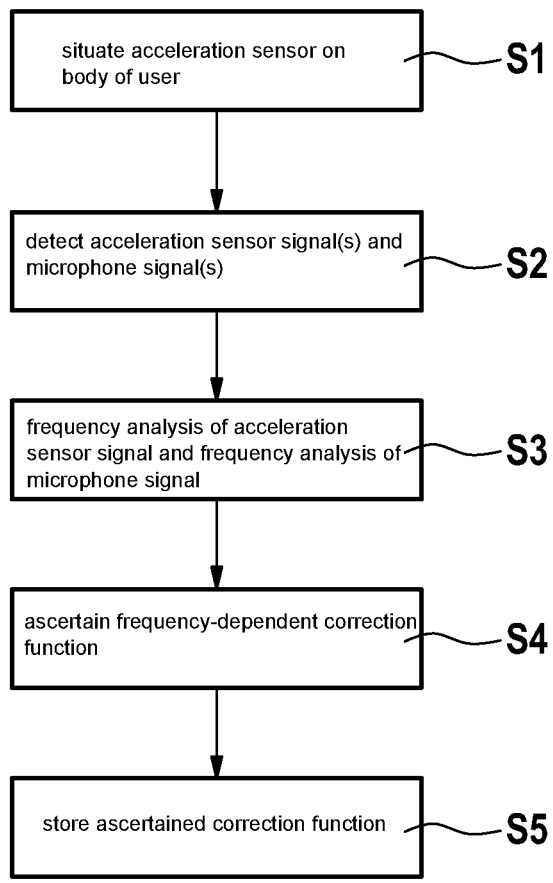
FIG. 4 shows a flowchart of a method for calibrating a structure-borne sound-sensitive acceleration sensor according to one specific embodiment of the present invention.

FIG. 4 shows a flowchart of a method for calibrating a structure-borne sound-sensitive acceleration sensor 4 with the aid of a microphone 2.

For this purpose, acceleration sensor 4 is situated in a first method step S1 in an intended position on the body of a user. For example, the user may put on a headphone for this purpose, into which the acceleration sensor is integrated. The calibration may now be started manually or automatically.

In a second method step S2, at least one acceleration sensor signal and at least one microphone signal are detected, the at least one acceleration sensor signal and the at least one microphone signal being synchronized and having been caused by a vocalization of the user.

In a method step S3, a frequency analysis of the acceleration sensor signal and a frequency analysis of the microphone signal are carried out.

In a method step S4, a frequency-dependent correction function for correcting the transmission function of the acceleration sensor is ascertained on the basis of the frequency analyses of the acceleration sensor signal and the microphone signal. The frequency-dependent correction function may be ascertained on the basis of the frequency analyses of multiple acceleration sensor signals and microphone signals each detected synchronously thereto, the acceleration sensor signals and the microphone signals having been caused by multiple vocalizations of one or multiple users.

In a method step S5, the ascertained correction function is stored on a memory unit 5 of acceleration sensor 4 and/or on an external memory unit 5, so that the correction function may be used for a later correction.

Figure 5:
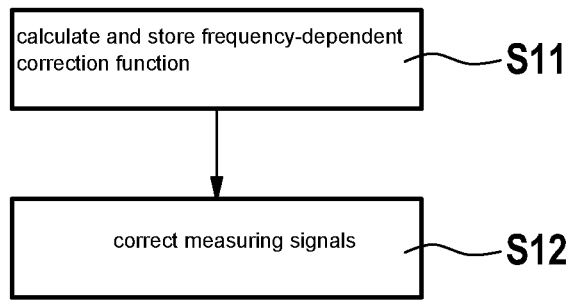
FIG. 5 shows a flowchart of a method for correcting the measuring signals of a structure-borne sound-sensitive acceleration sensor according to one specific embodiment of the present invention.

FIG. 5 shows a flowchart of a method for correcting the measuring signals of a structure-borne sound-sensitive acceleration sensor 4.

In a first method step S11, a frequency-dependent correction function for correcting the transmission function of acceleration sensor 4 is calculated and stored according to the method explained in FIG. 4 for calibrating a structure-borne sound-sensitive acceleration sensor 4 with the aid of a microphone 2.

In a second method step S12, the correction of the measuring signals is carried out with the aid of a signal processing unit of acceleration sensor 4, which applies the correction function to the measuring signals.

What is claimed is:

1. A method for calibrating a structure-borne sound-sensitive acceleration sensor using at least one microphone, the method comprising the following steps:
    arranging the acceleration sensor in an intended position on a body of a user;
    detecting at least one acceleration sensor signal and at least one microphone signal, the at least one acceleration sensor signal and the at least one microphone signal being synchronized and having been caused by a vocalization of the user;
    frequency analyzing the acceleration sensor signal and frequency analyzing the microphone signal; and
    ascertaining a frequency-dependent correction function of the acceleration sensor based on the frequency analysis of the acceleration sensor signal and the frequency analysis microphone signal.

2. The method as recited in claim 1, wherein the frequency analysis of the acceleration sensor signal and the frequency analysis of the microphone signal include a transformation into a frequency range to determine an amplitude response and a phase response.

3. The method as recited in claim 1, wherein the frequency-dependent correction function is ascertained based on a frequency analyses of multiple acceleration sensor signals and a frequency analyses of multiple microphone signals, each detected synchronously thereto, the acceleration sensor signals and the microphone signals having been caused by multiple vocalizations of one or multiple users.

4. The method as recited in claim 1, wherein parameters of the correction function are stored on a memory unit of the acceleration sensor and/or on an external memory unit.

5. The method as recited in claim 1, wherein the frequency analysis of the at least one acceleration sensor signal and/or the frequency analysis of the at least one microphone signal and/or the ascertainment of the correction function of the acceleration sensor takes place on an external signal processing unit outside the acceleration sensor.

6. The method as recited in claim 1, wherein the method is started as soon as the user has situated the acceleration sensor in the intended position and speaks for a first time.

7. The method as recited in claim 1, wherein the method is started as soon as a keyword spoken by the user is recognized.

8. A system for calibrating a structure-borne sound-sensitive acceleration sensor, which is situated in an intended position on the body of a user, the system comprising:
    a. at least one microphone, which is configured to detect at least one microphone signal when the acceleration sensor detects an acceleration sensor signal caused by a vocalization of the user;
    b. a signal processing unit, which is configured to carry out a frequency analysis of the acceleration sensor signal and a frequency analysis of the at least one microphone signal detected synchronously to the acceleration sensor signal and to ascertain a frequency-dependent correction function of the acceleration sensor based on the frequency analysis of the acceleration sensor signal and the frequency analysis of the at least one microphone signal; and
    c. a memory unit configured to store parameters of the ascertained correction function.

9. A method for correcting measuring signals of a structure-borne sound-sensitive acceleration sensor, for which a frequency-dependent correction function has been ascertained by: arranging the acceleration sensor in an intended position on a body of a user, detecting at least one acceleration sensor signal and at least one microphone signal, the at least one acceleration sensor signal and the at least one microphone signal being synchronized and having been caused by a vocalization of the user, frequency analyzing the acceleration sensor signal and frequency analyzing the microphone signal, and ascertaining the frequency-dependent correction function of the acceleration sensor based on the frequency analysis of the acceleration sensor signal and the frequency analysis microphone signal, the method comprising:
    correcting the measuring signals using a signal processing unit of the acceleration sensor, which applies the ascertained correction function to the measuring signals.

10. A method for correcting the measuring signals of a structure-borne sound-sensitive acceleration sensor, for which a frequency-dependent correction function has been ascertained by: arranging the acceleration sensor in an intended position on a body of a user, detecting at least one acceleration sensor signal and at least one microphone signal, the at least one acceleration sensor signal and the at least one microphone signal being synchronized and having been caused by a vocalization of the user, frequency analyzing the acceleration sensor signal and frequency analyzing the microphone signal, and ascertaining the frequency-dependent correction function of the acceleration sensor based on the frequency analysis of the acceleration sensor signal and the frequency analysis microphone signal, the method comprising:
    correcting the measuring signals outside the acceleration sensor, using an external signal processing unit, which applies the ascertained correction function to the measuring signals.

* * * * *